United States Patent
Ait-Ameur et al.

(10) Patent No.: US 8,429,257 B2
(45) Date of Patent: Apr. 23, 2013

(54) OPTIMIZING USE OF INTERNET PROTOCOL ADDRESSES

(75) Inventors: Samir Ait-Ameur, Fremont, CA (US); Ozzie Akpata, Piscataway, NJ (US); Emerando M. Delos Reyes, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 237 days.

(21) Appl. No.: 13/039,639

(22) Filed: Mar. 3, 2011

(65) Prior Publication Data

US 2012/0226787 A1   Sep. 6, 2012

(51) Int. Cl.
*G06F 15/177* (2006.01)

(52) U.S. Cl.
USPC .............. 709/222; 370/331; 370/389; 726/15

(58) Field of Classification Search .................. 709/220, 709/223, 239; 370/331, 389; 726/15
See application file for complete search history.

(56) References Cited

U.S. PATENT DOCUMENTS

| | | | |
|---|---|---|---|
| 7,356,841 B2 * | 4/2008 | Wilson et al. .................... 726/15 |
| 8,054,804 B2 * | 11/2011 | Small et al. .................... 370/331 |
| 8,156,246 B2 * | 4/2012 | Short et al. .................... 709/239 |
| 8,214,477 B2 * | 7/2012 | Battello et al. ................. 709/223 |
| 2004/0030765 A1 * | 2/2004 | Zilbershtein et al. ......... 709/223 |
| 2007/0230457 A1 * | 10/2007 | Kodera et al. ................. 370/389 |
| 2011/0238793 A1 * | 9/2011 | Bedare et al. ................. 709/220 |

* cited by examiner

*Primary Examiner* — Dustin Nguyen

(57) ABSTRACT

A network device receives a connection request from a user device. The network device determines whether an Internet Protocol (IP) address is assigned to the user device. The network device identifies the IP address when the IP address is assigned to the user device. Otherwise, the network device assigns the IP address to the user device. The network device also assigns a virtual local area network (VLAN) identifier (ID) associated with the IP address to use to satisfy the connection request.

20 Claims, 7 Drawing Sheets

OPTIMIZING USE OF INTERNET PROTOCOL ADDRESSES

BACKGROUND

Improvements in wireless network technology, including use of long term evolution (LTE) networks, have greatly increased the number of mobile devices. Moreover, individual mobile devices are frequently connecting to multiple web services at one time. Currently, a wireless network service provider needs to assign a unique Internet Protocol (IP) address for each connection between a particular mobile device and a particular web service. These factors cause a rapid depletion of available unassigned IP addresses (e.g., IP Version 4 (IPv4) address exhaustion, IP Version 6 (IPv6) address exhaustion) that may prevent network providers from providing new connections between mobile devices and web services.

Furthermore, IP addresses are currently segregated by wireless network providers into separate pools (where each pool is a logical group). When a particular mobile device (e.g., a Blackberry, an Android phone, etc.) tries to connect to a particular web service (e.g., www.example.com), an IP address only from a particular pool can be assigned. When one pool has heavy usage of its IP addresses, the quantity of the IP addresses in the one pool cannot increase even when one or more other pools are experiencing low usage of their IP addresses at same time. As a result, network providers further fail to optimize the use of existing IP addresses to diminish the IP address exhaustion problem.

DETAILED DESCRIPTION OF PREFERRED EMBODIMENTS

The following detailed description refers to the accompanying drawings. The same reference numbers in different drawings may identify the same or similar elements.

An implementation, described herein, may provide optimized use of IP addresses. A wireless network grid, provided by a wireless network provider, may include multiple nodes (e.g., network devices). The nodes may share a single pool of different IP addresses. The nodes may assign the IP addresses to different mobile devices. The nodes may exchange information to determine which ones of the nodes require more IP addresses than other nodes at certain times. The nodes may share the IP addresses amongst each other based on the exchanged information.

A mobile device may transmit a request to connect the mobile device to a particular web service. A node of the wireless network grid may determine whether an IP address is already assigned to the mobile device. If an IP address is already assigned to the mobile device, the node may identify the already assigned IP address and may assign a new virtual local area network (VLAN) identifier (ID), associated with the already assigned IP address, to connect the mobile device to the particular web service. The new VLAN ID (e.g., 2) may be an increment higher than the previously assigned VLAN ID (e.g., 1). Accordingly, the node may use the same IP address to connect the mobile device to multiple web services.

Figure 1:
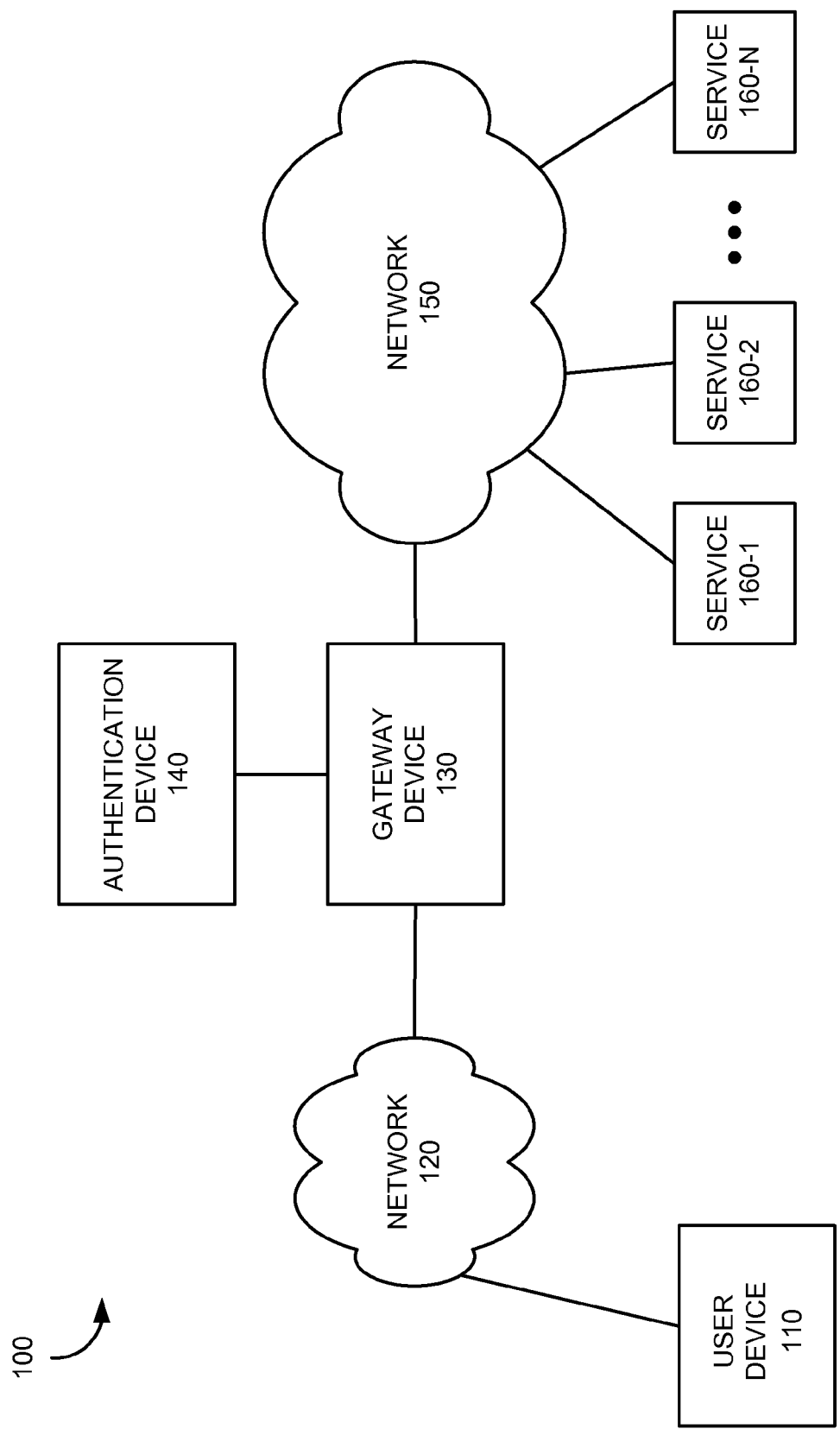
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include one or more of the following elements: a user device 110, a network 120, a gateway device 130, an authentication device 140, a network 150, and web services 160-1, 160-2, . . . , 160-N ($N_{13}$ >1) (collectively referred to as "services 160" and individually as "service 160"). While FIG. 1 shows a particular number and arrangement of elements, environment 100 may include additional, fewer, different, and/or differently arranged elements than are illustrated in FIG. 1. Alternatively, or additionally, one or more of the devices of environment 100 may perform one or more functions described as being performed by another one or more of the devices of environment 100. Devices of environment 100 may interconnect via wired connections, wireless connections, or a combination of wired and wireless connections.

User device 110 may include any device capable of transmitting and/or receiving data to/from network 120. User device 110 may include any computation or communication device, such as a mobile communication device that is capable of communicating via network 120. In one implementation, user device 110 may include a radiotelephone, a personal communications system (PCS) terminal (e.g., that may combine a cellular radiotelephone with data processing and data communications capabilities), a smart phone, a personal digital assistant (PDA), a mobile telephone device, a laptop, a handheld computer, a personal media player, etc. User device 110 may allow a user of user device 110 to access a web application provided by one of services 160.

Network 120 may represent a portion of a single network, a single network, multiple networks of a same type, or multiple networks of different types. For example, network 120 may include a portion of a cellular network (e.g., a 3G network, a 4G network, etc.), a wireless network (e.g., a general packet radio service (GPRS) network), a Public Switched Telephone Network (PSTN), a local area network (LAN), a wide area network (WAN) (e.g., the Internet), a metropolitan area network (MAN), a subset of the Internet, an ad hoc network, a fiber optic network (e.g., a fiber optic service network), or any combination of the aforementioned networks. A cellular network may include one or more of a radio access network (e.g., a long term evolution (LTE) network or an enhanced high rate packet data (eHRPD) network) and a wireless core network (e.g., referred to as an evolved packet core (EPC) network).

Network 120 may include network devices that transmit data and/or facilitates transmission of data between user device 110 and gateway device 130. Each one of the network devices may take the form of a routing device, a switching device, a multiplexing device, or a device that performs a combination of routing, switching, and/or multiplexing functions. The network devices may include eNodeBs, antennas, serving gateways (SGWs), etc.

Gateway device 130 may include a packet data network gateway (PGW) and/or a gateway GPRS support node (GGSN). Gateway device 130 may provide connectivity from user device 110 to external packet data networks by being the point of exit and entry of traffic for user device 110. Gateway device 240 may perform policy enforcement, packet filtering, and other services relating to the access of user device 110 to an external packet data network. Gateway device 130 may be connected to one or more SGWs of network 120 and/or authentication device 140. Gateway device 130 may also be connected to network 150. Network 150 may act as a core network that provides the connection for user device 110 to services 160.

Authentication device 140 may include a Remote Authentication Dial In User Service (RADIUS) server; an Authentication, Authorization, and Accounting (AAA) server; and/or one or more other devices that provide authentication services. Authentication device may include one or more servers and/or one or more other computing devices. Authentication device 140 may be implemented as hardware or as a combination of hardware and software. Authentication device 140 may be connected to gateway device 130 and/or one or more other gateway devices.

In one example, a user may initiate a session using user device 110. User device 110 may transmit a registration request for the session to gateway device 130. Gateway device 130 may receive, via network 120 and/or one or more other networks, the registration request from user device 110. Gateway device 130 may generate and transmit an authentication request, based on the registration request, and transmit the authentication request to authentication device 140.

Authentication device 140 may receive the authentication request, for user device 110, from gateway device 130. The authentication request may include an identification (e.g., a password, a personal identifier, etc.) associated with user device 110. Authentication device 140 may determine whether to authenticate user device 110 (i.e., allow access to user device 110) based on whether the identification matches a key used to determine whether to authenticate user device 110. Gateway device 130 may receive an authentication response (allowing or denying access) from authentication device 140. In response to receiving the authentication response, gateway device 130 may create a session corresponding to user device 110 when the authentication response indicates that user device 110 is allowed to access one or more services 160.

Network 150 may include network devices that assign IP addresses, as described further below in reference to FIG. 2. For example, network 150 may include a portion of a cellular network (e.g., a 3G network, a 4G network, etc.), a wireless network (e.g., a general packet radio service (GPRS) network), a Public Switched Telephone Network (PSTN), a local area network (LAN), a wide area network (WAN) (e.g., the Internet), a metropolitan area network (MAN), a subset of the Internet, an ad hoc network, a fiber optic network (e.g., a fiber optic service network), or any combination of the aforementioned networks.

Services 160 may represent any devices capable of transmitting and/or receiving data to/from user device 110. Each one of services 160 may correspond to different web services. Service 160 may represent a single server or a collection of multiple computing devices and/or computer systems. Service 160 may provide one or more web services (e.g., a web site). Service 160 may transmit data to and receive data from user device 110 after network 150 assigns a VLAN associated with an IP address for a connection between user device 110 and service 160.

Figure 2:
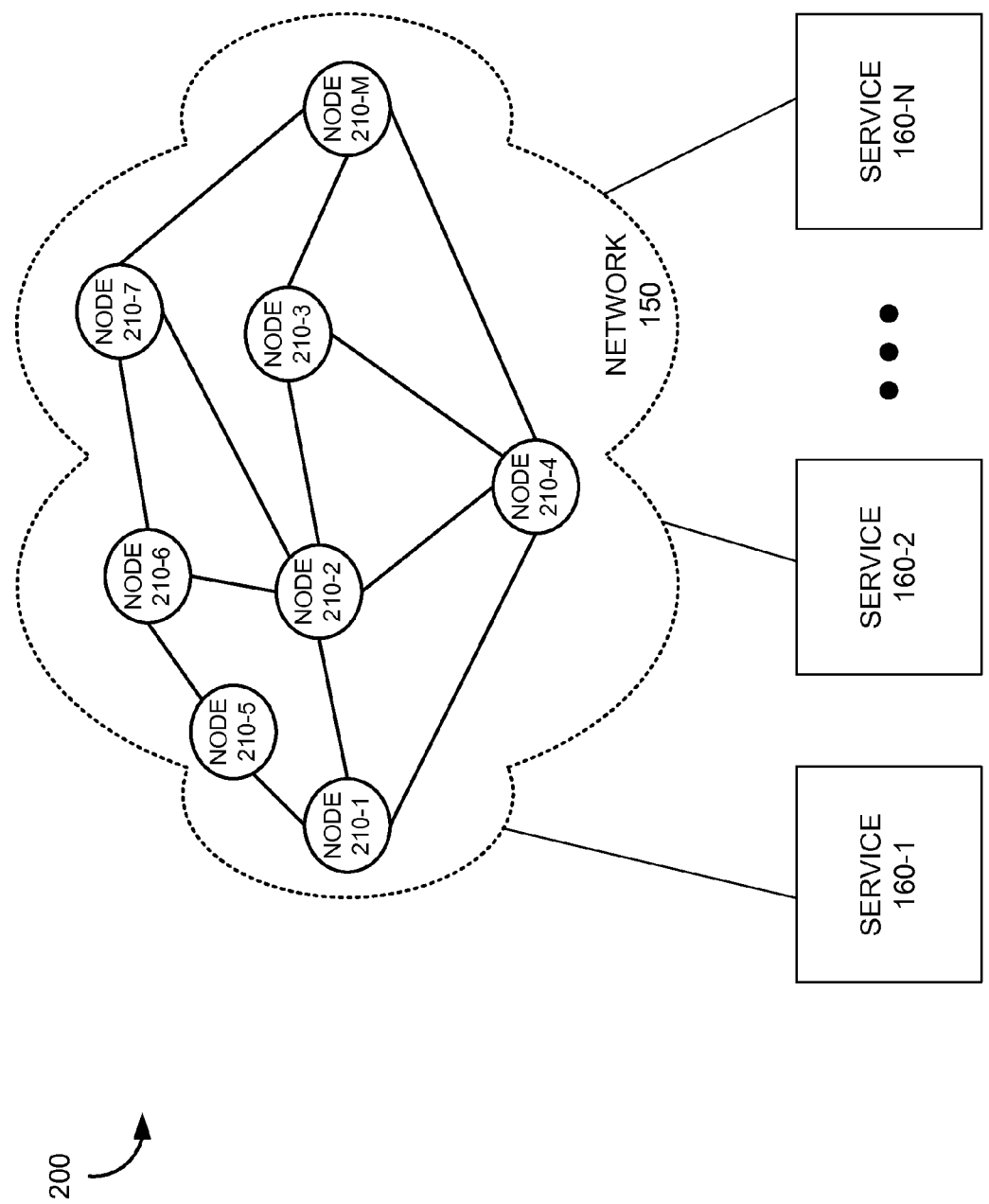
FIG. 2 is a diagram of an example portion of the example environment of FIG. 1.

FIG. 2 is a diagram of an example portion 200 of environment 100. Portion 200 may represent a part of a network, which is maintained by a wireless network service provider, that assigns IP addresses to mobile device (e.g., user device 110) to permit transmission of requests to connect to services 160. Portion 200 may include network 150 and services 160.

As shown, network 150 may include a network grid of nodes 210-1, 210-2, ..., 210-M (M≧1) (collectively referred to as "nodes 210" and individually as "node 210"). Nodes 210 may connect via a number of network links. The network links may include wired and/or wireless links. Each node 210 may connect to one or more other nodes 210. While FIG. 2 shows a particular number and arrangement of nodes 210, network 150 may include additional, fewer, different, or differently arranged nodes 150 than are illustrated in FIG. 2. Each one of nodes 210 may correspond to a different geographic location (e.g., New York).

Node 210 may include a network device, a computer device (e.g., a server), one or more computer devices, etc. Node 210 may receive, from gateway device 130, a connection request to connect user device 110 to one of services 160. If user device 110 is not already connected to another one of services 160, node 210 may assign an IP address and a VLAN ID (e.g., 1) for the connection. If an IP address is already assigned to user device 110 (e.g., user device 110 is already connected to another one of services 160), node 210 may identify the assigned IP address and assign a new VLAN ID (e.g., 2) for the connection. Node 210 may facilitate the connection between user device 110 and service 160. Nodes 210 may share a single pool of IP addresses. Node 210 may assign the IP address regardless of what particular service 160 user device 110 requests to connect with. Nodes 210 may exchange information about the assigning of IP addresses. Nodes 210 may share the IP addresses in a pool based on the exchanged information.

Figure 3:
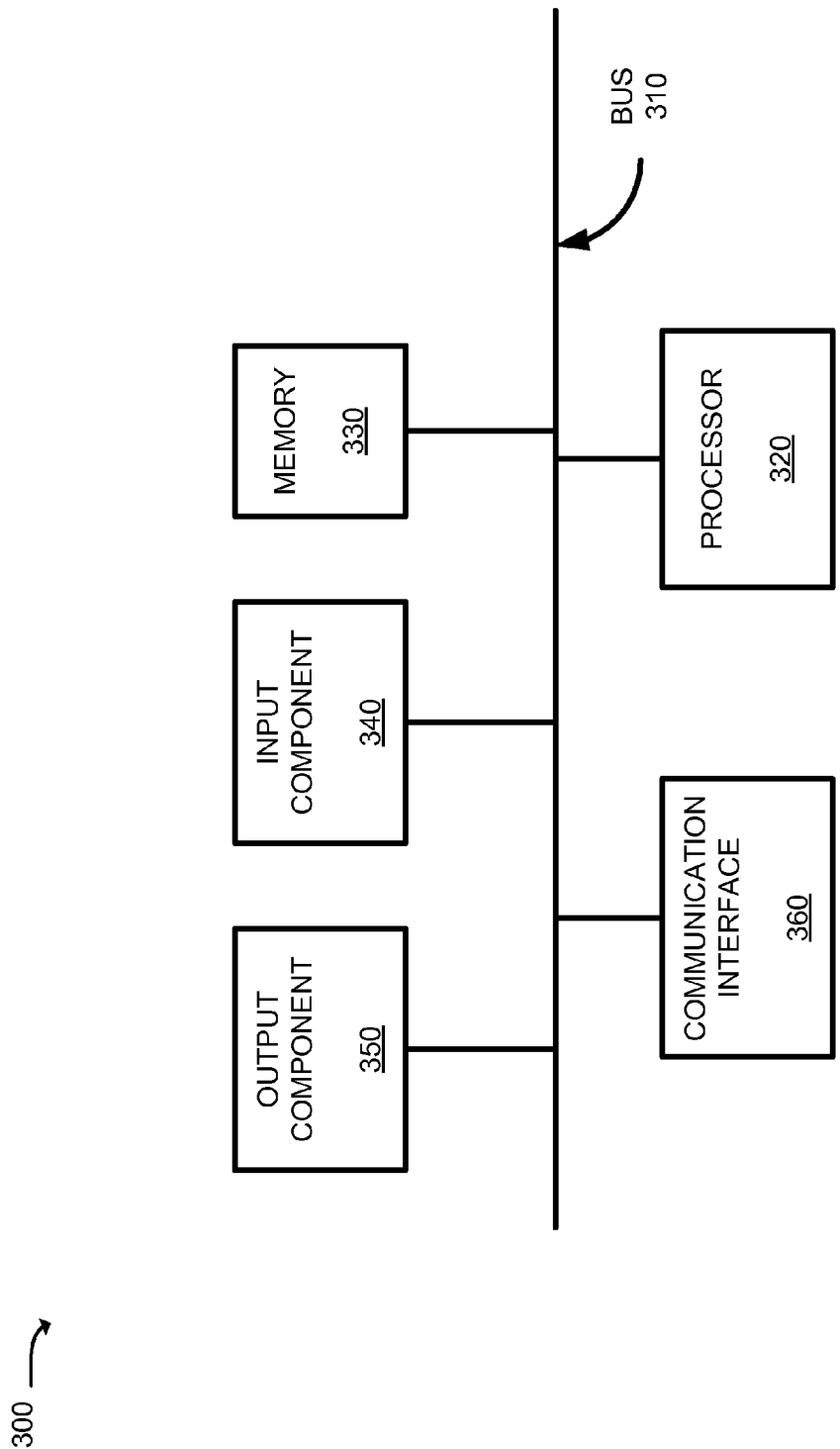
FIG. 3 is a diagram of example components of one or more devices of FIG. 1 and/or nodes of FIG. 2.

FIG. 3 is a diagram of example components of a device that may correspond to one or more of the devices of environment 100 (FIG. 1) and/or one of more of the nodes of portion 200 (FIG. 2). Alternatively, or additionally, each one of the devices shown in environment 100 and/or the nodes shown in portion 200 may include one or more devices 300 and/or one or more of each one of the components of device 300.

Device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit them over the air, and receive RF signals over the air and provide them to communication interface 360. In one implementation, for example, communication interface 360 may communicate with network 120 and/or devices connected to network 120.

Device 300 may perform certain operations described herein. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
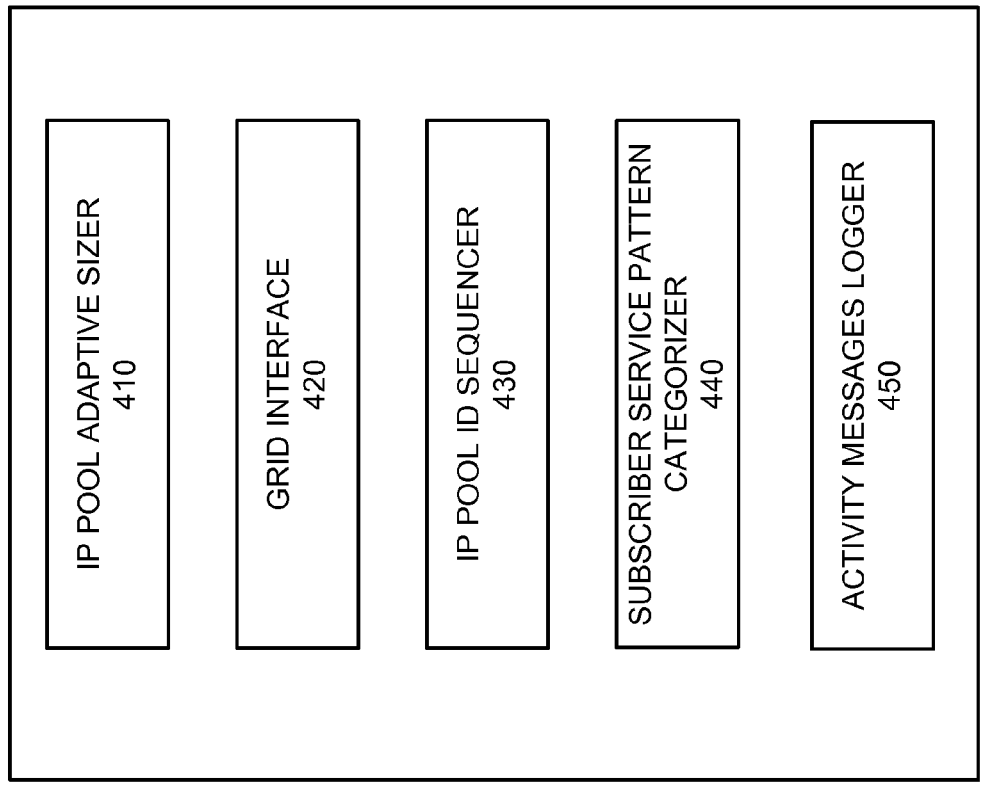
FIG. 4 is a diagram of example functional components of one of the nodes of FIG. 2.

FIG. 4 is a diagram of example functional components of node 210. Each one of the functional components may correspond to one or more software and/or hardware components. As illustrated in FIG. 4, node 210 may include an IP pool adaptive sizer 410, a grid interface 420, an IP pool ID sequencer 430, a subscriber service pattern categorizer 440, and an activity message logger 450. In other implementation, node 210 may include additional functional components, fewer functional components, different functional components, and/or differently arranged functional components than are shown in FIG. 2. Alternatively, or additionally, one or more functional components of node 210 may perform one or more other tasks described as being performed by one or more other functional components of node 210.

Node 210 may have access to a predefined quantity of IP addresses, of a single IP pool shared by a network grid, that node 210 may assign. IP pool adaptive sizer 410 may determine a quantity of IP addresses that node 210 requires during different time periods in order to satisfy connection requests from a maximum possible quantity of user devices (e.g., including user device 110). The different time periods may be defined by using for example, one or more of specific times of day (e.g., 5:00 AM), days of the week, dates, types of days (e.g., holidays, weekends), etc.), etc. In some implementations, IP pool adaptive sizer 410 may define the different time periods based on when a maximum usage of IP addresses is relatively similar for a particular time period.

For explanatory purposes only, assume that node 210-1, which assigns IP addresses to user devices (e.g., user device 110) in New York, like all other nodes 210 of network 150, initially has access to one thousand (1000) IP addresses that node 210-1 may assign to the user devices. IP pool adaptive sizer 410 may track how many IP addresses are required by node 210-1, to satisfy all connection requests received by node 210-1, at different times. For example, IP pool adaptive sizer 410 may determine that node 210-1 does not assign any IP addresses between 1:00 AM and 5:00 AM on Sundays, assigns a maximum of 50% (e.g., 500) of its IP addresses between 5:00 AM and 9:00 AM on Sundays, etc. IP pool adaptive sizer 410 may generate a message based on the determinations.

Grid interface 420 may correspond to one or more input/output (I/O) ports of node 210. Node 210 may transmit the message about its usage of IP addresses to all other nodes 210 of network 150 via grid interface 420. The message may include, for example, information about a number of IP addresses that node 210 requires or assigns during different time periods or a number of extra IP addresses (that node 210 does not assign) that node 210 has available during the different time periods. Node 210 may also receive messages from all the other nodes 210 about their usage of IP addresses via grid interface 420.

IP pool ID sequencer 430, of node 210, may determine from what other nodes 210, node 210 may retrieve additional IP addresses for particular period(s) of time when node 210 requires an extra quantity of IP addresses to, for example, connect all user devices that request connection with service 160. IP pool ID sequencer 430, of node 210, may make the determination(s) based on the messages received from the other nodes 210. For example, IP pool adaptive sizer 410 of node 210-1 may determine that node 210-1 requires a maximum of 1250 IP addresses between 8:00 AM and 12:00 PM on Mondays. IP pool adaptive sizer 410 and/or IP pool ID sequencer 430, of node 210-1, may determine that node 210-1 needs to receive an extra 250 IP addresses from other nodes 210 for the time period between 8:00 AM and 12:00 PM on Mondays.

For explanatory purposes only, assume that node 210-2 assigns a maximum of 500 IP addresses between 5:00 AM and 9:00 AM on all weekdays and assigns a maximum of 950 IP addresses during all other time periods. Further assume that node 210-4 assigns a maximum of 750 IP addresses between 10:00 AM and 1:00 PM on all weekdays and assigns a maximum of 550 IP addresses during all other time periods. IP pool ID sequencer 430, of node 210-1, may determine, based on a message received from node 210-2, that node 210-2, on Monday, has an extra 500 IP addresses between 8:00 AM and 9:00 AM (i.e., 1000 total IP address—500 IP addresses that node 210-2 may assign between 8:00 AM and 9:00 AM on Monday) and an extra 50 IP addresses between 9:00 AM and 12:00 PM (i.e., 1000 total IP address—950 IP addresses that node 210-2 may assign between 9:00 AM and 12:00 PM on Monday). IP pool ID sequencer 430 may further determine, based on a message received from node 210-4, that node 210-4, on Monday, has an extra 250 IP addresses between 10:00 AM and 12:00 PM and an extra 450 IP addresses between 8:00 AM and 10:00 AM.

Before 8:00 AM on Monday, IP pool ID sequencer 430, of node 210-1, may determine from which nodes to retrieve extra IP addresses in a variety of ways (e.g., based on a predefined list of preferences of nodes 130, by using a variety of algorithms that reduce resource cost(s) associated with transferring IP addresses, etc.). In the example described above, IP pool ID sequencer 430, of node 210-1, may determine to use 250 IP addresses that originate from node 210-2 between 8:00 AM and 9:00 AM on Monday, to use 50 IP addresses that originate from node 210-2 between 9:00 AM and 12:00 AM on Monday, and to use 200 IP addresses that originate from node 210-4 between 9:00 AM and 12:00 AM on Monday.

Subscriber service pattern categorizer 440 may assign an IP address and/or a VLAN ID associated with the IP address to connect user device 110 to service 160, as described further below in reference to FIG. 6. In another implementation, subscriber service pattern categorizer 440 may also determine patterns related to what types of user devices (e.g., Blackberry) are connecting to what types of services via node 210, which is associated with a particular geographic location. Network 150 and/or other network grids may use the pattern information for the initial allocation of all IP addresses between nodes 210 of network 150 and/or nodes of the other network grids.

Activity message logger 450 may track activity of all other functional components of node 210. Activity message logger 450 may receive data from the other functional components of node 210 after each one of the functional components performs an action. Activity message logger 450 may store and organize the data. Activity message logger 450 may share the data with the other functional components of node 210, as necessary. For example, after IP pool adaptive sizer 410, of node 210-1, determines that node 210-1 requires an extra 250 IP addresses between 8:00 AM and 12:00 PM on Mondays, IP pool adaptive sizer 410 may transmit data to activity message logger 450 with the information. Activity message logger 450 may share the information with IP pool ID sequencer 430, of node 210-1. Based on the information, IP pool ID sequencer 430 may determine from what other nodes 210, node 210-1 can receive the extra 250 IP addresses between 8:00 AM and 12:00 PM on Mondays.

Figure 5:
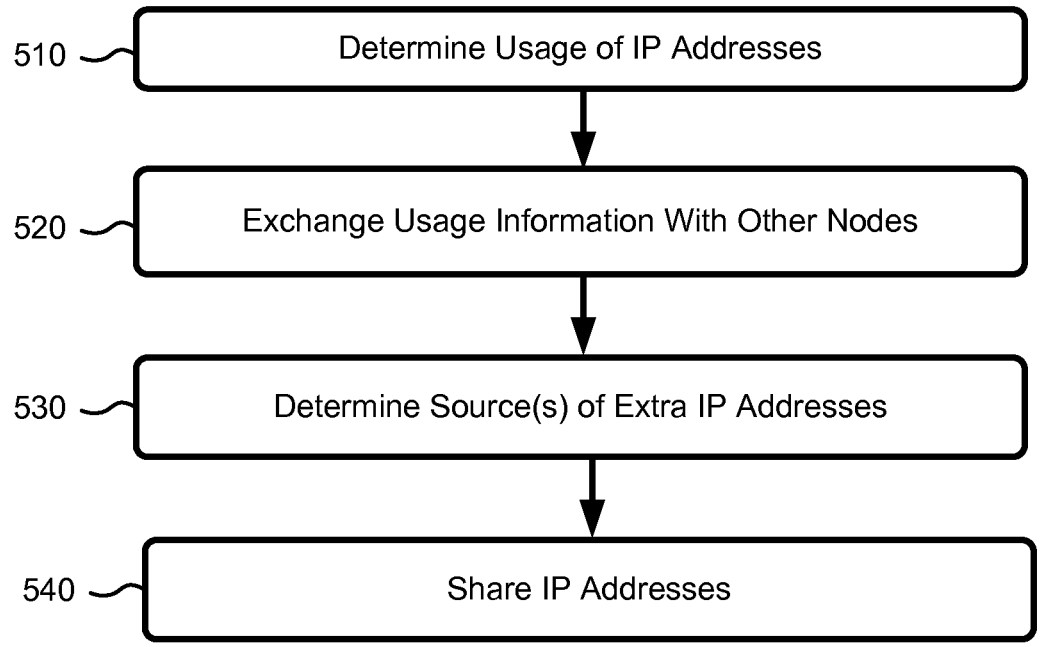
FIG. 5 is a flowchart of an example process for sharing IP addresses.

FIG. 5 is a flowchart of an example process 500 for sharing IP addresses. In one example implementation, node 210 may perform process 500. Alternatively, process 500 may be performed by one or more other devices, alone or in combination with node 210.

Process 500 may include determining usage of IP addresses (block 510). For example, nodes 210 of network 150 may assign IP addresses from a single pool. An initial portion of the pool may be allocated for node 210 to assign. Node 210 may determine usage of IP addresses (herein, usage information) by tracking quantities of IP addresses that node 210 assigns at different times. In one implementation, node 210 may analyze the quantities to determine different maximum quantities of IP addresses which are required by node 210, to satisfy all connection requests received by node 210, during predefined time periods. In another implementation, node 210 may analyze the quantities to define different time periods based on when quantities of IP addresses being used are relatively similar. Node 210 may determine different maximum quantities of IP addresses required during the defined time periods.

Process 500 may further include exchanging usage information with other nodes (block 520). For example, node 210 may generate an outgoing message based on the usage information. Node 210 may transmit the outgoing message (e.g., on a periodic basis) to all other nodes 210 of network 150. Node 210 may receive incoming messages from all other nodes 210 of network 150. A particular incoming message may include usage information of one of the other nodes 210 that generated the particular incoming message.

Process 500 may also include determining sources of extra IP addresses (block 530). For example, node 210 may determine during what time periods node 210 requires extra IP addresses (i.e., in addition to those IP addresses already allotted to node 210) in order to satisfy all connection requests that require assigning of IP addresses (e.g., based on a quantity of user devices connecting to services 160 via node 210). Node 210 may further determine quantities of the extra IP addresses that node 210 requires during those time periods. Based on the usage information in the incoming messages, node 210 may determine which one(s) of the other nodes 210 may provide the extra IP addresses during those time periods.

Process 500 may further include sharing IP addresses (block 540). For example, assume that node 210-1 receives a particular quantity of extra IP addresses, which node 210-1 requires for a particular time period, from either one of node 210-2 or node 210-4. Before the beginning of the particular time period, node 210-1 may transmit a request for the particular quantity of extra IP addresses to node 210-2. In response to the request, node 210-2 may provide the particular quantity of extra IP addresses to node 210-1.

In another implementation, if node 210-2 does not have the particular quantity of extra IP addresses to provide, node 210-1 may receive a reply to the request that indicates that node 210-2 cannot provide the particular quantity of extra IP addresses to node 210-1. Node 210-2 may not have the particular quantity of extra IP addresses to provide when, for example, node 210-2 already provided all its extra IP addresses for the particular time period to another one of nodes 210 (e.g., node 210-3). In response to the reply from node 210-2, node 210-1 may transmit a second request to node 210-4. In response to the second request, node 210-4 may provide the particular quantity of extra IP addresses to node 210-1. Similarly, during other time periods, when node 210-1 nodes require all of its allocated IP addresses, node 210-1 may provide extra IP addresses to other nodes (e.g., node 210-2) in response to requests from the other nodes.

Figure 6:
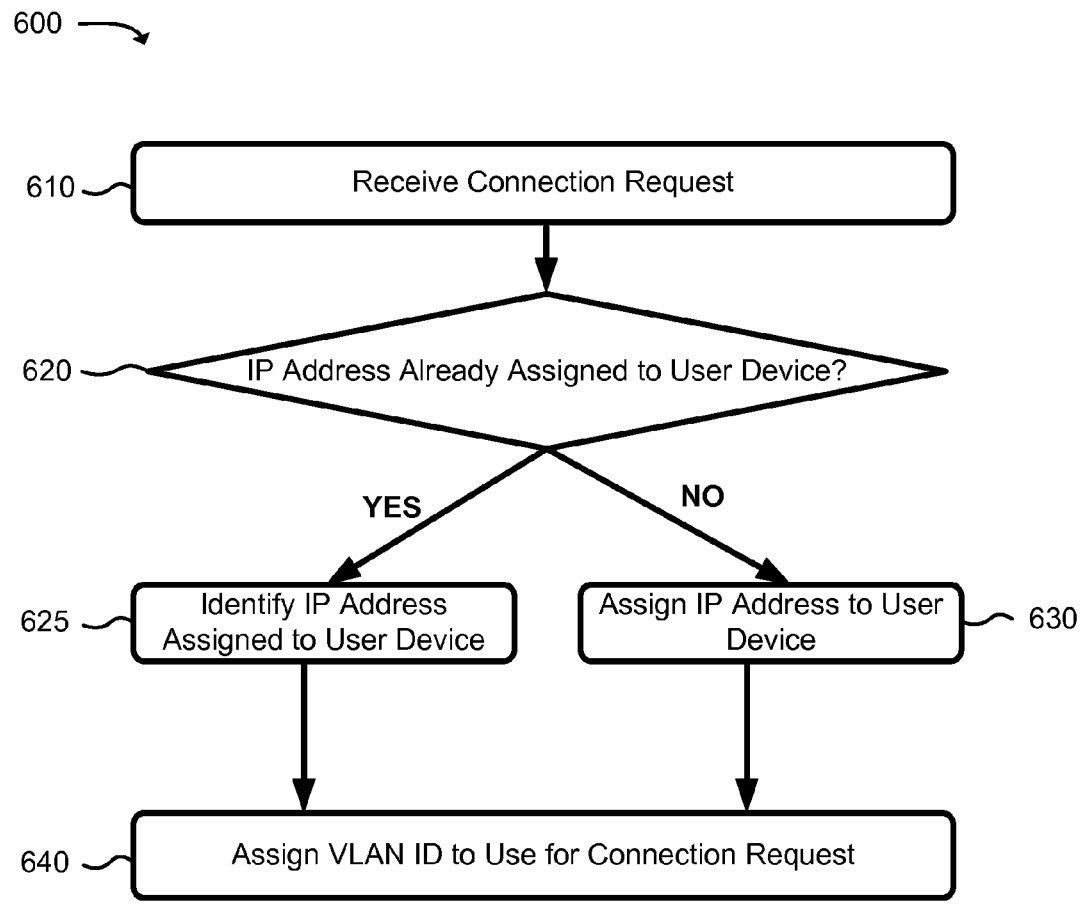
FIG. 6 is a flowchart of an example process for assigning IP addresses.

FIG. 6 is a flowchart of an example process 600 for assigning IP addresses. In one example implementation, node 210 may perform process 600. Alternatively, process 600 may be performed by one or more other devices, alone or in combination with node 210. A portion of process 600 will be discussed below with corresponding references to a flow diagram 700 of FIG. 7.

Figure 7:
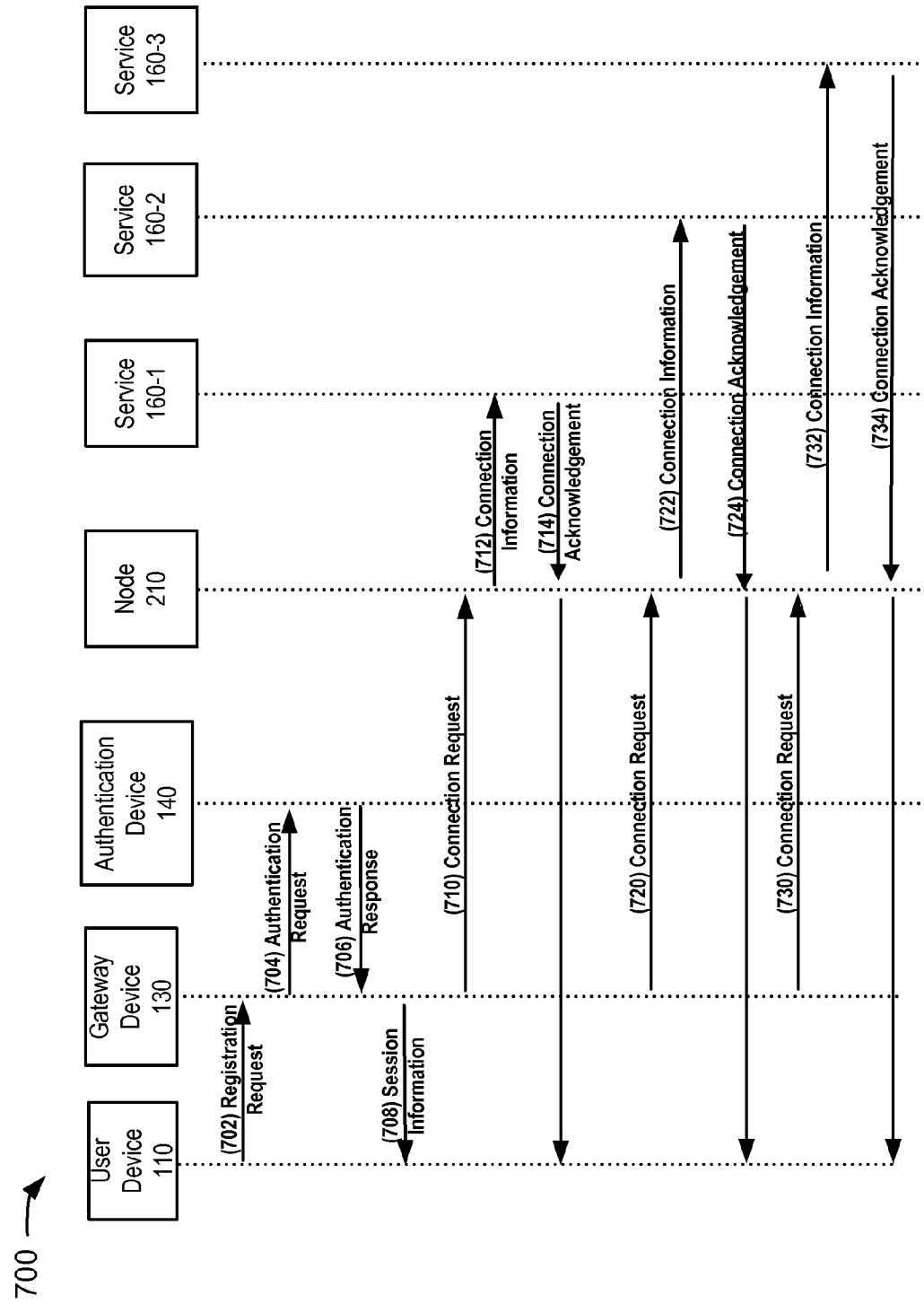
FIG. 7 is an example flow diagram for assigning virtual local area network (VLAN) identifiers (IDs) that are associated with an IP address.

Prior to node 210 initiating process 600, a user of user device 110 may initiate a process to connect user device 110 to network 120 (e.g., by the user powering on user device 110, entering inputs to access a web service provided by one of services 160, etc.). User device 110 may transmit, via network 120, a registration request 702 (as shown in FIG. 7) to gateway device 130. Registration request 702 may include identifier information associated with user device 110. Gateway device 130 may receive registration request 702. In response, gateway device 130 may generate an authentication request 704 based on registration request 702. Gateway device 130 may transmit authentication request 704 to authentication device 140.

Authentication device 140 may receive authentication request 704. Authentication device 140 may compare the identifier information, obtained from authentication request 704, to identifier information stored in a memory associated with authentication device 140. If authentication device 140 determines that the received identifier information does not match the stored identifier information, then authentication device 140 may send, to gateway device 130, an authentication response 706. Authentication response 706 may indicate that user device 110 cannot be authenticated. Gateway device 130 may receive the authentication response and may send an indication (not shown in FIG. 7) to user device 110, denying access to user device 110.

If, however, authentication device 140 determines that the received identifier information matches the stored identifier information, then authentication device 140 may retrieve subscriber information associated with user device 110. The subscriber information may include particular access point names (APNs) and/or corresponding packet data networks (PDNs) associated with services 160 that are available to user device 110. Authentication device 140 may send, to gateway device 130, authentication response 706. Here, authentication response 706 may indicate that user device 110 has been authenticated and may include the retrieved subscriber information. Gateway device 130 may receive authentication response 706, and, based on authentication response 706, determine that user device 110 was authenticated by authentication device 140. In response, gateway device 130 may setup a session for user device 110. Gateway device 130 may transmit session information 708, about the setup of the session, to user device 110. User device 110 may receive session information 708 and configure user device 110 based on configuration information included in session information 708.

In one implementation, registration request 702 may include a service identifier (e.g., an APN (e.g., www.example.com)) associated with service 160 (e.g., service 160-1) that the user wants to access. In another implementation, gateway device 130 may receive, after transmitting session information 708 to user device 110, an additional message (not shown in FIG. 7) from user device 110 that includes the service identifier associated with service 160. In yet another implementation, gateway device 130 may determine the service identifier based on other information included in registration request 702 and/or an additional message received from user device 110.

If, for example, the service identifier is specified in the subscriber information that was included in authentication response 706, then gateway device 130 may generate a connection request 710. Connection request 710 may include a user device identifier of user device 110 and the service identifier. Gateway device 130 may transmit connection request 710 to network 150.

Returning to FIG. 6, process 600 may include receiving a connection request (block 610). For example, node 210 of network 150 may receive, from gateway device 130, connection request 710. Node 210 may retrieve, from connection request 710, the user device identifier of user device 110 and the service identifier of service 160-1.

Process 600 may further include determining whether an IP address is already assigned to user device 110 (block 620). For example, node 210 may determine whether an IP address is already assigned to user device 110 based on the user device identifier of user device 110. Node 210 may determine that the IP address is already assigned when node 210 previously assigned the IP address to user device 110 and user device 110 remains connected to at least one of services 160. If the IP address is already assigned to user device 110 (block 620—YES), node 210 may identify the IP address of user device 110 (block 625). For example, node 210 may identify the IP address that is assigned to user device 110 by using the user device identifier.

If an IP address is not already assigned to user device 110 (block 620—NO), node 210 may assign an IP address to user device 110 (block 630). As discussed above, node 210 may assign IP addresses from a portion of a single pool of IP addresses shared by all nodes 210 of network 150. Node 210 may select one of the IP addresses from the portion to assign to user device 110 regardless of which one of services 160 user device requested to connect with.

With respect to the example shown in FIG. 7, node 210 may determine that an IP address is not already assigned to user device 110 after receiving connection request 710. Accordingly, node 210 may select an IP address, and assign the IP address for connections associated with user device 110.

Process 600 may also include assigning a VLAN ID to use for a connection request (block 640). For example, in one implementation, node 210 may store and/or have access to a VLAN counter associated with the IP address assigned to user device 110. Node 210 may initialize a value of the VLAN counter to equal "0" after assigning the IP Address to user device 110. The value of the VLAN counter may indicate an ID of a VLAN ID assigned to use for a previously received connection request received for user device 110, if any. After receiving a new connection request and identifying the IP address assigned to user device 110 (block 625) or assigning the IP address assigned to user device 110 (block 630), node 210 may increase the value of the VLAN counter by "1." Node 210 may assign a VLAN ID, equal to the newly increased value of the VLAN counter, to use for the new connection request. In another implementation, node 210 may determine a maximum value of the maximum VLAN ID which was previously assigned in association with the IP address. Node 210 my assign a VLAND ID equal to, for example, the maximum value increased by "1" to use for the new connection request.

With respect to the example shown in FIG. 7, node 210 may increase, after receiving connection request 710, a value of a VLAN counter for user device 110 from 0 to 1. Accordingly, node 210 may assign VLAN ID 1 for connection request 710. Node 210 may retrieve a specification for service 160-1 based on the service identifier of service 160-1. Node 210 may generate connection information 712 based on the specification. The specification may define what information to include in connection information 712. Connection information 712 may include, for example, information associated with user device 110.

Node 210 may use VLAN ID 1 of the assigned IP address to forward connection information 712 to service 160-1. Service 160-1 may receive connection information 712. In response, service 160-1 may establish a connection to network 150 via VLAN ID 1. Service 160-1 may generate connection acknowledgment 714 to indicate that a connection that satisfies connection request 710 has been established with service 160-1. Service 160-1 may transmit connection acknowledgment 714 to node 210. Node 210 may forward connection acknowledgment 714 or information included in connection acknowledgment 714 to user device 110 to indicate that the connection has been successfully established between user device 110 and service 160-1. Connection acknowledgment 714 may include data (e.g., home page of a website) to allow user device 110 to interact with service 160-1. Thereafter, the user of user device 110 may access, for example, a web application provided by service 160-1.

Afterwards, user device 110 may transmit another message (not shown in FIG. 7), via network 120, to gateway device 130. The message may include a request to connect user device 110 to service 160-2. Gateway device 130 may generate connection request 720 based on the message. Connection request 720 may include the user identifier of user device 110 and a service identifier of service 160-2. Node 210 may receive connection request 720. Node 210 may, in response to connection request 720 and based on the user identifier, determine that an IP address is already assigned to user device 110. Node 210 may identify the IP address. Node 210 may retrieve a VLAN counter associated with the IP address. In this example, a value of the VLAN counter may equal 1.

Node 210 may increase the value of the VLAN counter by 1 to equal 2. Node 210 may assign VLAN ID 2 to connection request 720. Node 210 may retrieve a specification for service 160-2 based on the service identifier of service 160-2. Node 210 may generate connection information 722 based on the specification. Node 210 may use VLAN ID 2 of the assigned IP address to transmit connection information 722 to service 160-2. In response to connection information 722, service 160-2 may establish a connection that satisfies connection request 720 via VLAN ID 2. Service 160-2 may generate connection acknowledgment 724 to indicate that the connection has been established. Service 160-2 may transmit connection acknowledgment 724 to node 210. Node 210 may forward connection acknowledgment 724 or information included in connection acknowledgment 724 to user device 110. Thereafter, the user of user device 110 may access, for example, a web site provided by service 160-2.

Subsequently, user device 110 may transmit another message (not shown in FIG. 7), via network 120, to gateway device 130. The message may include a request to connect user device 110 to service 160-3. Gateway device 130 may generate connection request 730 based on the message. Node 210 may receive connection request 730. Node 210 may, in response to connection request 730, determine that an IP address is already assigned to user device 110. Node 210 may identify the IP address. Node 210 may retrieve a VLAN counter associated with the IP address. In this example, a value of the VLAN counter may equal 2. Node 210 may increase the value of the VLAN counter by 1 to equal 3.

Node 210 may assign VLAN ID 3 to connection request 730. Node 210 may retrieve a specification for service 160-3. Node 210 may generate connection information 732 based on the specification. Node 210 may use VLAN ID 3 of the assigned IP address to transmit connection information 732 to service 160-2. In response to connection information 732, service 160-3 may establish a connection that satisfies connection request 730 via VLAN ID 3. Service 160-2 may generate connection acknowledgment 734 to indicate that the connection has been established. Service 160-2 may transmit connection acknowledgment 734 to node 210. Node 210 may forward connection acknowledgment 734 or information included in connection acknowledgment 734 to user device 110. Thereafter, the user of user device 110 may access, for example, any type of web service provided by service 160-3.

The foregoing description provides illustration and description, but is not intended to be exhaustive or to limit the invention to the precise form disclosed. Modifications and variations are possible in light of the above teachings or may be acquired from practice.

While series of blocks have been described with regard to FIGS. 5 and 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code-it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    determining, by a network device of a network grid, a quantity of extra IP addresses required to satisfy connection requests for a first time period;
    identifying, by the network device, one or more other network devices, of the network grid, as sources of the quantity of the extra IP addresses;
    receiving, by the network device, the quantity of extra IP addresses from one or more of the one or more other network devices;
    selecting, by the network device, a particular IP address from a plurality of IP addresses that include the extra IP addresses;
    assigning, by the network device and during the first time period, the particular IP address to a user device; and
    assigning, by the network device, a virtual local area network (VLAN) identifier (ID), associated with the IP address, to the user device.

2. The method of claim 1, further comprising:
    receiving a request to establish a connection between the user device and a device that provides a service,
    the VLAN ID being assigned to establish the connection based on the request.

3. The method of claim 1, further comprising:
    determining that no IP address is already assigned to the user device before selecting the particular IP address.

4. The method of claim 1, where assigning the VLAN ID to the user device comprises:
    increasing a value of a VLAN counter associated with the user device; and
    assigning the VLAN ID to the user device based on the value of the VLAN counter as the VLAN ID.

5. The method of claim 1, where assigning the VLAN ID to the user device comprises:
    determining a maximum value used for a different VLAN ID for a previous connection associated with the particular IP address; and
    assigning the VLAN ID to the user device based on one more than the maximum value as the VLAN ID.

6. The method of claim 1, where determining the quantity of the extra IP addresses comprises:
    determining the quantity of the extra IP address based on information regarding quantities of IP addresses, corresponding to different time periods, that are needed to satisfy connection requests during the different time periods.

7. The method of claim 1, further comprising:
receiving, from a different network device, a request for a requested quantity of IP addresses for a second time period;
determining whether the requested quantity of IP addresses are available for sharing during the second time period; and
transmitting the requested quantity of IP addresses to the different network device when the requested quantity of IP addresses are available for the sharing during the second time period.

8. The method of claim 7, further comprising:
transmitting a reply, to the request, that indicates that the network device is unable to provide the requested quantity of IP addresses when the requested quantity of IP addresses are not available for sharing during the second time period.

9. A network device comprising:
a memory to store instructions; and
a processor to execute one or more of the instructions to:
determine an additional quantity of Internet Protocol (IP) addresses that are to be used, along with other IP addresses to form a particular quantity of IP addresses, for a particular time period;
identify one or more other network devices, of a network grid, as sources of the additional quantity of IP addresses;
receive the additional quantity of IP addresses from one or more of the one or more other network devices;
receive a request to establish a connection between a user device and a device that provides a service,
assign, during the particular time period, an IP address, of the particular quantity of IP addresses, to the user device, and
assign, based on the request and for the connection, a virtual local area network (VLAN) identifier (ID) associated with the IP address.

10. The network device of claim 9, where the connection request comprises:
a first identifier of the user device, and
a second identifier of the service.

11. The network device of claim 9, where, when assigning the VLAN ID associated with the IP address, the processor is further to:
determine a value of a VLAN counter,
increase the value of the VLAN counter to a new value, and
assign the VLAN ID based on the new value.

12. The network device of claim 11, where, when assigning the IP address to the user device, the processor is further to:
determine that no IP address is already assigned to the user device;
select, after determining that no IP address is already assigned to the user device, the IP address from a portion of a pool of IP addresses associated with the network grid, and
initialize the VLAN counter to equal a predefined value.

13. The network device of claim 9, where the processor is further to:
receive a specification for the service,
generate connection information based on the specification, and
transmit the connection information to the device that provides the service.

14. The network device of claim 13,
where the processor is further to:
receive a connection acknowledgement from the device that provides the service, and
where the connection acknowledgement indicates an establishment of the connection between the user device and the device that provides the service by using the VLAN ID associated with the IP address.

15. A non-transitory computer-readable medium storing instructions, the instructions comprising:
one or more instructions that, when executed by at least one processor, cause the at least one processor to:
determine a first additional quantity of IP addresses that are to be used, along with other IP addresses to form a first quantity of IP addresses, for a first time period;
identify one or more nodes, of a network grid, as sources of the first additional quantity of IP addresses;
receive, before the first time period, the first additional quantity of IP addresses from the one or more nodes;
assign, during the first time period, a first IP address of the first quantity of IP addresses to a first user device;
assign a first virtual local area network (VLAN) identifier (ID), associated with the first IP address, for a first connection by the first user device; and
establish the first connection between the first user device and a first device that provides a first service by using the first VLAN ID associated with the first IP address.

16. The non-transitory computer-readable medium of claim 15, the instructions further comprising:
one or more instructions that, when executed by the at least one processor, cause the at least one processor to:
assign a second VLAN ID associated with the first IP address to use for a second connection by the first user device; and
establishing the second connection between the first user device and a second device that provides a second service by using the second VLAN ID associated with the first IP address.

17. The non-transitory computer-readable medium of claim 15, the instructions further comprising:
one or more instructions that, when executed by the at least one processor, cause the at least one processor to:
assign a second IP address of the first quantity of IP addresses to a second user device;
assign a second VLAN ID associated with the second IP address to use for a second connection by the second user device; and
establish the second connection, by using the second VLAN ID associated with the second IP address, between the second user device and the first device that provides the first service or a second device that provides a second service.

18. The non-transitory computer-readable medium of claim 17, where a second value of the second VLAN ID is equal to the first value of the first VLAN ID or a different value.

19. The non-transitory computer-readable medium of claim 15, the instructions further comprising:
one or more instructions that, when executed by the at least one processor, cause the at least one processor to:
determine a second additional quantity of IP addresses that are to be used, along with other IP addresses to form a second quantity of IP addresses, for a second time period; and
retrieve, before the second time period, the second additional quantity of IP addresses from the one or more nodes or from one or more different nodes of the network grid.

20. The non-transitory computer-readable medium of claim 15, the instructions further comprising:
one or more instructions that, when executed by the at least one processor, cause the at least one processor to:
determine an extra quantity of IP addresses that are more than a second quantity of IP addresses that are to be used during a second time period; and
receive, before the second time period, a request for a portion of the extra quantity of IP addresses from a requesting node of the network grid,
the requesting node being one of the one or more nodes or a different node of the network grid; and
transmit, based on the request, the portion of the extra quantity of IP addresses to the requesting node.

* * * * *